Figure 1:
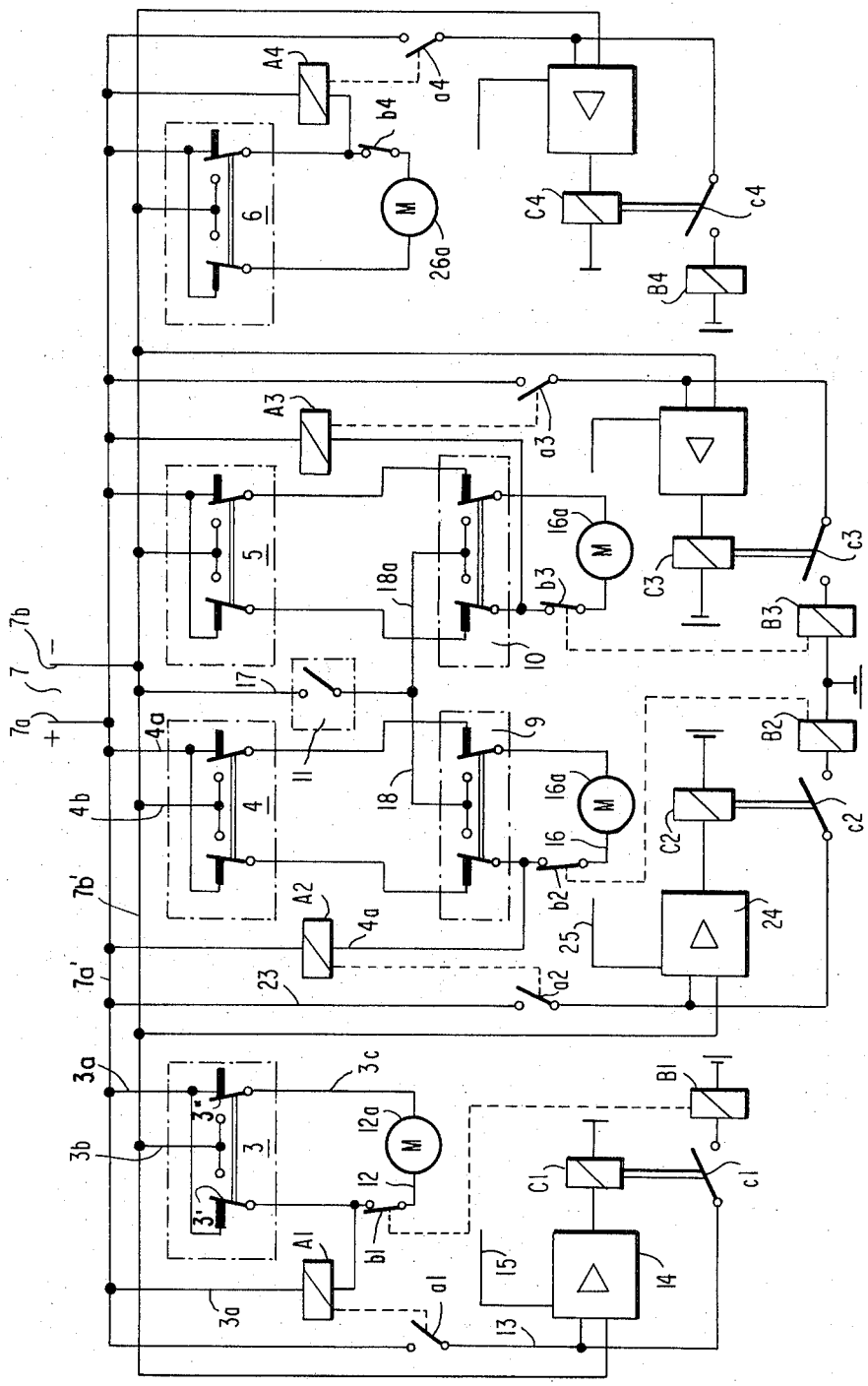

United States Patent [19]
Berger

[11] 3,815,005
[45] June 4, 1974

[54] PROTECTIVE DEVICE FOR ELECTRICALLY OPERATED WINDOWS, ESPECIALLY OF MOTOR VEHICLES

[75] Inventor: Josef Berger, Notzingen, Germany

[73] Assignee: Daimler-Benz Aktiengesellschaft, Stuttgart, Germany

[22] Filed: Aug. 17, 1972

[21] Appl. No.: 281,300

[30] Foreign Application Priority Data
Aug. 17, 1971 Germany............................ 2141150

[52] U.S. Cl. ............................... 318/466, 318/286
[51] Int. Cl. ............................................. H02p 1/22
[58] Field of Search............................ 318/466, 286

[56] References Cited
UNITED STATES PATENTS

| | | | |
|---|---|---|---|
| 3,513,374 | 5/1970 | Koment | 318/286 X |
| 3,581,174 | 5/1971 | Hammer | 318/466 |
| 3,617,835 | 11/1971 | Dreher | 318/466 X |
| 3,624,473 | 11/1971 | Robbins | 318/466 X |
| 3,651,389 | 3/1972 | Ito et al. | 318/466 X |
| 3,689,814 | 9/1972 | Holt | 318/286 X |
| 3,733,532 | 5/1973 | Hill | 318/286 X |

*Primary Examiner*—E. Dobeck
*Attorney, Agent, or Firm*—Craig & Antonelli

[57] ABSTRACT

An installation for the protection against the squeezing-in by windowpanes or similar pivotal or displaceable structural parts actuable by reversible electric motors, particularly in motor vehicles, which includes a switch at each required place; an electronic control circuit is adapted to be fed with current by the respective switch of the structural part at the same time as the energizing circuit for the corresponding driving motor; the electronic control circuit responds to pulses produced by body contact with a predetermined part such as the upper edge of the windowpane and causes the standstill or reversal of direction of rotation of the driving motor.

10 Claims, 2 Drawing Figures

PROTECTIVE DEVICE FOR ELECTRICALLY OPERATED WINDOWS, ESPECIALLY OF MOTOR VEHICLES

The present invention relates to an installation for the protection against injury due to squeezing-in in electrically actuatable windowpanes, electrically operated sliding roofs or other structural parts pivotal or displaceable by electric motors in fixed frames, especially of motor vehicles. The aim underlying the present invention resides in enabling each person disposed in a space provided with these movable structural parts, for example, in enabling each vehicle passenger near a vehicle window to undertake the selective opening and closing thereof.

In modern motor vehicles, especially in passenger motor vehicles, auxiliary forces required or available as such for the vehicle drive, for example, the vacuum in the suction pipe or manifold, the battery current or compressed air of pumps or the like continuously driven with a running engine are utilized far-reachingly for the purpose of facilitating to the passenger the opening of one or several vehicle windows. As is known, for the most part the electric current of the electric power supply of the vehicle is utilized as auxiliary force for the desired opening of the vehicle door or of the vehicle window for venting purposes or for the closing thereof to avoid air drafts or the entry of undesired air components, noxious gases or of rain. This is also true for the movement and actuation of the sliding roof.

The large movable structural parts, however, require a considerable power input also with a favorable transmission or gearing ratio of the motor driving force which with increasing resistance to movement in the guide parts and/or with changing temperatures and depending on the weather may considerably increase and overload the customary driving motor. The use of a large driving motor which also overcomes the aforementioned difficulties and hindrances, increases the danger of a squeezing-in of body parts of injury due to passenger, for example, of his or her arm or hand or individual fingers or also of the entire head left inadvertently in the opening to be covered or covering the fixed frames thereof during the closing operation. The powerful motor can thereby cause considerable body injuries especially with children, or other serious injuries or damages to clothing parts can occur.

The elimination of this squeezing-in danger by the movable structural parts with the use of powerful driving motors is the aim of the present invention. A solution to the underlying problem consists according to the present invention in the installation of a protective circuit device in which an electronic control circuit together with the energizing circuit for the driving motor of the movable structural part, for example, of the door window near the driver or co-driver is adapted to be supplied with electric current by the switch thereof and in that the electronic control circuit is energizable by means of pulses upon contact of a part predetermined as shifting or switching key, preferably located at the upper edge of the windowpane or of the movable structural part or of the fixed opening frame, with simultaneous interaction on means for the stoppage or reversal of the direction of rotation of the driving motor.

In one preferred embodiment of the protective installation according to the present invention, in addition to the customary actuating switch for the driving motor, a relay is connected in parallel with the driving motor, whereby a switch for the electronic control circuit is dependent from this relay. The control signals, for example, in the form of control pulses triggered when contacting the upper edge of the windowpane or of the movable structural part bring about in the electronic control circuit the current supply to a relay connected in the output thereof. Finally, the switch control led by this relay energizes a further relay which acts on a switch in the motor energizing circuit. As a result thereof, the energizing circuit for the motor collapses (opens up) and the driving motor stops.

The usual measures to protect the movable structural parts located within a predetermined space area, for example, the windows of the rear doors against unauthorized actuation, for example, by children, can be utilized without difficulty also in the arrangement according to the present invention. After the installation of a safety switch in a place accessible only in a certain area, for example, at the instrument panel in front of the driver, a further actuating series-connected switch is provided for each rear window in addition to the usual switch.

Another embodiment of the present invention causes during the beginning of a squeezing-in operation not only an immediate standstill or stoppage of the driving motor but also the immediate reversal of the direction of rotation of the motor in the opposite direction. The advantage of this solution resides in the avoidance of the danger that the vehicle passenger seeks thoughtlessly to tear loose slightly squeezed-in body parts or materials or other objects whereby injuries or damages can easily occur. In order to preclude these erroneous actions, the switch for the driving motor is provided according to the present invention as reversing switch and the current supply of the control circuit takes place on the one hand, directly from the power supply and, on the other, by way of a relay connected in the output of the control circuit by way of which the energizing circuit for the control circuit is adapted to be closed.

In this manner, a reversal of movement of the windowpane or the like which takes place immediately in the presence of a switching or keying pressure is realizable and the protective installation is suited with corresponding fine-feel of the keying or switching transmitting means for every pressure sensitivity.

Of course, it is also possible to arrange the keying wire which changes its capacity upon abutment against an object and thereby produces or triggers a control signal at the upper edge of each safety pane, i.e., of the moved structural part as it may also be similarly mounted at the guide frame of the fixed structural part, for example, of the vehicle body.

Accordingly, it is an object of the present invention to provide an installation for the protection against a squeezing-in action caused by movable structural parts, especially in motor vehicles, which avoids by simple means the aforementioned shortcomings and drawbacks encountered in the prior art.

Another object of the present invention resides in an installation for the protection against the squeezing-in caused by movable structural parts such as windowpanes actuated by electric motors, which is simple in construction and reliable in operation yet permits the use of sufficiently powerful driving motors to achieve the intended opening and closing function under all circumstances.

A further object of the present invention resides in a protective installation protecting against squeezing-in of body parts or clothing parts by movable parts of a motor vehicle actuated by an auxiliary force which utilizes simple control circuits involving relatively inexpensive parts to achieve the desired goals.

Figure 2:
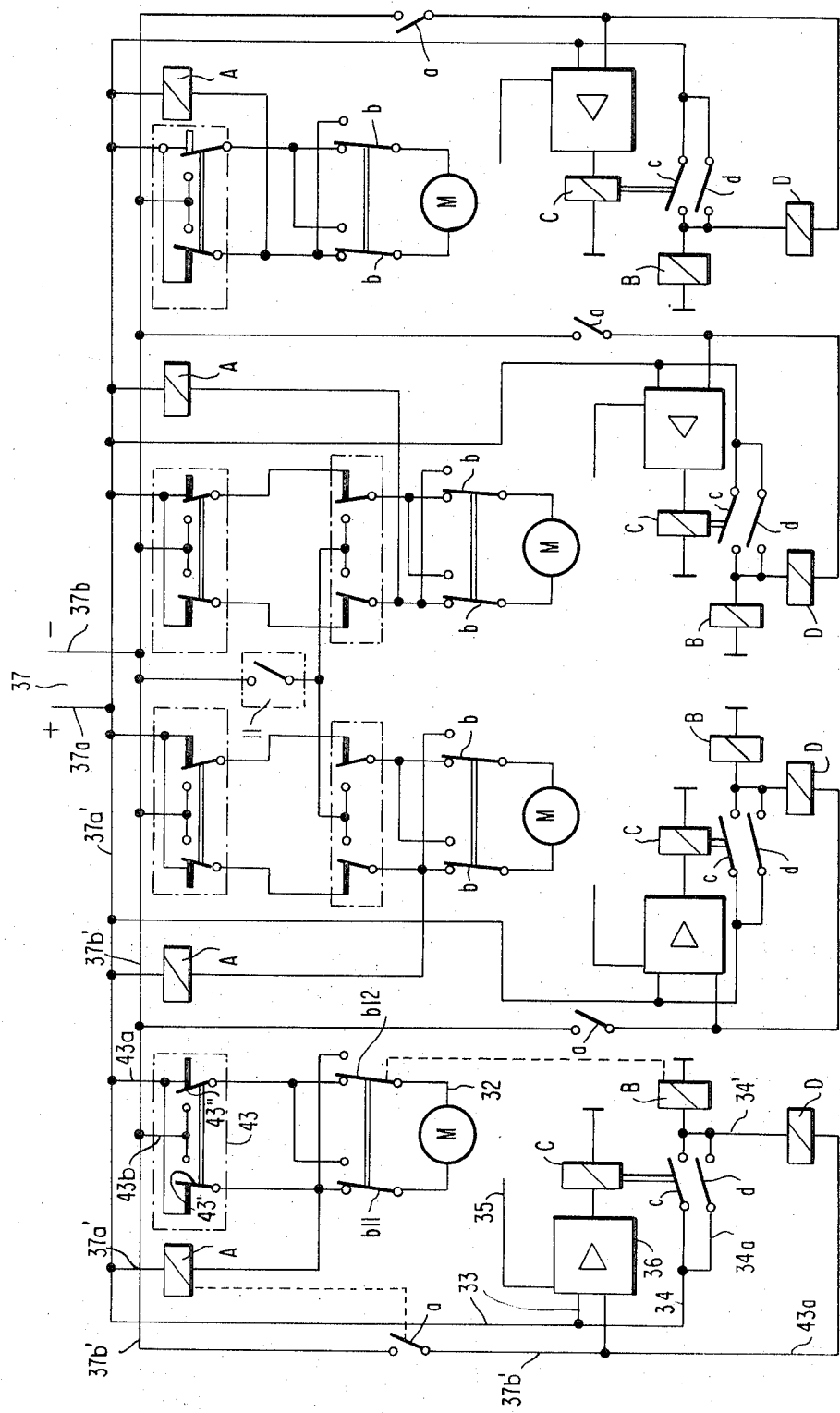

These and further objects, features and advantanges of the present invention will become more apparent from the following description when taken in connection with the accompanying drawing which shows, for purposes of illustration only, two embodiments in accordance with the present invention and wherein:

FIG. 1 is a schematic circuit diagram of a protective installation in accordance with the present invention for a vehicle window adapted to be raised and lowered by means of an electrical motor with instantaneous stoppage of the motor movement in case of a squeezing-in; and FIG. 2 is a schematic circuit diagram of a protective installation according to the present invention for a motor vehicle window adapted to be raised and lowered by means of an electric motor with immediate reversal of the motor movement in case of squeezing-in.

Referring now to the drawing wherein like reference numerals are used throughout the two views to designate like parts, for purposes of opening or closing the windows of a motor vehicle by the driver or also by the co-driver, if located between the two, the respective actuating switches 3 to 6 normally provided at the instrument panel or the like, within easy reach of the driver, are connected in the vehicle interior with the electrical power supply 7 for energizing a respective motor 26a at each vehicle window as is shown in the control circuit diagram of FIG. 1. For the safety against unauthorized window movements of the rear windows or against any movements thereof not desired by the driver, as might be initiated by children or other vehicle rear passengers, the further switches 9 and 10 provided at or in proximity to the respective rear doors and connected in series with rear switches 4 and 5 at the instrument panel are both adapted to be connected with ground only by way of a safety switch 11. Thus, actuation of the rear windows by means of switches 9 and 10 accessible from the rear seats is possible only upon closing of the safety switch 11 by the driver. The switches 3, 4, 5, 6, 9, and 10 are conventional toggle or rocker-type switches, as presently used in connection with electrically actuated windows which can be selectively depressed in either of two opposite directions of pivotal movement to open or close the respective window from a central, neutral position. In FIG. 1, the switches 3, 6, 9 and 10 are shown in this central, neutral position.

The driving motor 26a for the window of the co-driver is connected in series with the switch 6 for the co-driver window in a similar manner. This switch arrangement is known as such.

Since the protective installation is constructed identically at all windows, only the installation at one window, namely at the driver window, will be described hereinafter in detail. The switch 3 at the instrument panel or the like serves for the current supply of the motor 12a for the driver windowpane and is connected with the vehicle ground 7b by way of a line 3b and a line 7b. In the illustrated position, the rocker-type switch 3 is connected with both switch arms 3' and 3" with the same battery terminal 7a by way of the line 4a and line 3a so that motor 12a cannot become energized. In order to interrupt the energizing circuit of the motor associated with the driver windowpane, after the switch arm 3' has been brought into contact with line 3b upon correspondingly depressing the rocker-type switch 3, upon abutment of the windowpane at an object between its upper edge and the upper leg of the fixed window frame for purposes of reducing the squeezing-in effect, in addition to the switch 3 a relay $A_1$ is connected in series with the motor energizing circuit 12 in a line 3a from the positive terminal 7a of the power supply 7 by way of line 7a' to the motor energizing circuit 12. This relay $A_1$ which is energized when the switch arm 3' engages with line 3b, controls a switch $a_1$ in an energizing line 13 also connected with the positive terminal 7a of the power supply 7 by way of line 7a'; the energizing line 13 serves as input line for an electronic control circuit 14 of conventional construction and therefore not described in detail herein.

For the prevention of an injury by a squeezing-in effect of a pane in the closing movement, the upper edge of each pane is provided with a wire 15 which is connected to a control input of the electronic control circuit 14 and serves as keying or switching wire and is exposed in the upward direction. With a pane made of safety glass, the wire can also be inserted between the two panes at the upper edges thereof. The wire 15 conducts the control signals from the capacity change upon its impingement or abutment at a body part or the like to the electronic control circuit 14 and causes the latter to operate in a conventional manner to cause an energizing current to flow in relay $C_1$ connected in its output.

The signals, for example, in the form of a pulse or pulses from the switching member 15 cause by means of the electronic control circuit 14 the current supply or energization of the relay $C_1$ connected in the output of the control circuit 14, which relay $C_1$ closes the switch $c_1$ controlled thereby. The relay $B_1$ is energized from the energizing circuit 13 connected with the power supply 7 by the closed switch $c_1$. As a result thereof, the normally closed switch $b_1$ in the motor energizing circuit 12 is opened and as a consequence thereof, the driving motor 12a becomes de-energized. After an elimination of the obstacle, the motor energizing circuit 12 is closed again, and the interrupted upward movement of the windowpane is continued up to the final abutment in the normally closed condition of the window.

In a customary manner, as at the driver windowpane, each windowpane in the rear space is actuatable by way of the switches 4 and 5 within reach of the driver or by way of switches 9 and 10 within reach of the rear passengers, if the safety switch 11 actuatable by the driver is closed. The energizing circuit of the motor arranged at the respective rear window, for example, the energizing circuit 16 of the motor 16a arranged for the left rear door window, is adapted to be supplied with current upon actuation of switch 9 only after the closing of the safety switch 11 arranged in the grounded line 17 to be undertaken by the driver. For the operation of the electronic control circuit 24 installed for this rear door window, the energizing circuit 23 extends by way of line 7a' from the power supply terminal 7a to the electronic control circuit 24.

The windowpane of the co-driver door or of a rear door is actuatable in a similar manner as the pane of the driver door by actuation of the switch 6 or 4 and 5 identical to the switch 3 at the driver door. The switch 4 is connected with the vehicle ground 7b by way of the line 4b and line 7b' in a similar manner. The current feed of the motor-energizing circuit 16 takes place by way of the switch 4. A relay $A_2$ is arranged in the line 4a in a similar manner as at the driver door, which upon energization in the closed motor energizing circuit 16, causes the closing of the switch $a_2$ in the energizing circuit 23 to the electronic control circuit 24.

The passenger in the rear can also initiate the current supply to the motor 16a at the switch 9. The switch 9 arranged in a similar manner in the rear space in parallel with the switch 4 is connected with the ground line 17 by way of the closed safety switch 11 by means of a line 18. The control of a switch $b_2$ dependent on the relay $B_2$ and arranged in the motor energizing circuit 16 takes place by way of the electronic control circuit 24 in a similar manner as at the driver door window by way of a relay $C_2$ energized after the transmission of control signals to the electronic control circuit 24 by means of the keying or switching wire 25 at the left rear door windowpane; the relay $C_2$ in turn closes the switch $c_2$ controlled thereby in the energizing line 23 and thus connects the relay $B_2$ with the power supply 7. As a result thereof, the switch $b_2$ is opened and the closing of the window is interrupted.

The current supply of the right rear window takes place in a similar manner as that of the left rear window by means of the additional switch 10 located near the rear door. This additional switch 10 is operatively connected in the aforementioned manner with the switch 5 at the instrument panel. It is connected to vehicle ground by means of a line 18a like the ground line 18 of the additional switch 9 of the left rear door by way of the safety switch 11 and by means of the line 17.

If the window-actuating motor upon impinging upon an obstacle is not only to become de-energized, as is the case by the caused disconnection of the energizing circuit which takes place in the embodiment of FIG. 1 by means of the electronic control circuit 14 or 24 in each motor-energizing circuit upon impingement of the respective pane against an obstacle, then the aforementioned control circuit has to be expanded in a suitable manner, for example, for an immediate reversal of the direction of rotation of the motor. The embodiment of the control circuit illustrated in FIG. 2 serves this purpose.

The electrical installation of FIG. 2 is approximately identical to that of FIG. 1. In the embodiment of FIG. 2, the rocker-type switch, corresponding to the switch 3 of FIG. 1, is designated by reference numeral 43 and includes switch arms 43' and 43'' corresponding to switch arms 3' and 3'' of FIG. 1. However, differing from the embodiment of FIG. 1, the switch $b_1$ of FIG. 1 which is a simple open-close switch is replaced in the embodiment of FIG. 2 by a conventional reversing switch $b_{11}$–$b_{12}$ which is operable in a conventional manner to reverse the direction of rotation of the motor M by way of its energizing circuit 32 even though the switch arm 43' is depressed to close the window, as soon as the relay B becomes energized. The positive terminal 37a of the power supply 37 is again connected with the electronic control circuit 36 of conventional construction by way of the line 37a' and line 33. A line 34 branches off from the line 33 and leads by way of the switch c controlled by relay C to one side of the coil of relay B, the other side of which is connected to ground, i.e., with the negative terminal 37b. Consequently, the relay B is energized by way of line 37a', 33 and 34 when the switch c is closed. Energization of the relay B actuates the reversing switch $b_{11}$–$b_{12}$ to thereby connect the energizing circuit 32 of the motor M for the window at the driver door in such a manner that it will be rotated in the opening direction of the window, even though the switch arm 43' remains depressed. The line 34 also leads to one end of the energizing winding of relay D, the other end of which is connected with ground 37b by way of a line 43a and 37b' including switch A. Hence, relay D will be energized upon closure of switch c provided relay A has become energized and closed its switch a. The switch d, closed upon energization of relay D, thereby closes the holding circuit 34a connected in parallel with the switch c in line 34.

The current supply of the relay C by the electronic control circuit 36 which is permanently connected with the power supply 37 by way of the line 33 takes place after the application of control signals to the electronic control circuit 36 which are produced when the keying or switching wire 35 hits an obstacle.

The relay D is connected, as mentioned above, with the vehicle ground 37b by means of the line 43a and by way of line 37b' including the switch a. This switch a is controlled, as in the first-mentioned embodiment, by the relay A which is arranged at the instrument panel in parallel to the switch 43 actuatable by the driver. The relay D is adapted to be supplied with current by way of the switch d in a branch line 34a between the energizing line 33 and the branch line 34'. The relay D is supplied with current for such length of time as the switch 43 is actuated in the closing direction by depressing switch arm 43' and the electronic control circuit 36 has responded, i.e., the window moves in the opening direction as long as the switch 43 is actuated in the closing direction. The motor energizing circuit 32 is interrupted only when the switch 43 is in the normal rest position.

By the construction of the energizing switch dependent on the relay B in the output of the switch c as reversing switch $b_{11}$–$b_{12}$, there takes place with a current supply of the relay C in the output of the electronic control circuit 36 and of the relay B with a closed switch c, which is initiated by way of the electronic control circuit 36 by the control signals from the keying or switching wire 35, a reversal of the driving direction by the pair of reversing switches $b_{11}$–$b_{12}$ in the motor energizing circuit 32 and therewith a lowering of the windowpane causing the squeezing pressure.

In the position shown in FIG. 2, the rocker-type switch 43 of conventional construction is again shown in its neutral position. If the rocker-type switch 43 is pivoted in one direction such that the switch arm 43'' makes contact with the line 43b, then the window is lowered. If the switch 43 is pivoted in the opposite direction so that switch arm 43' makes contact with line 43b, then the window is actuated in the closing direction. The respective movements of the window are thereby taking place only for such length of time as the corresponding switch part 43 is depressed. Upon removal of pressure on the switch 43, it will return into its central, neutral position and the movement of the window stops.

In both the closing as well as in the opening switch position of switch 43, the motor energizing circuit 32 is supplied with current by way of line 37a', line 43a, the respective switch arm, the reversing switches $b_{11}$, $b_{12}$ and the other switch arm as well as line 43b and line 37b'. The relay A is thereby energized only when the switch arm 43' is depressed to contact the line 43b, i.e., when the motor M is energized in the window-closing direction. Upon energization, the relay A also closes simultaneously the switch a. As a result thereof, the electronic control circuit 36 is energized by way of ines 37b', switch a, and lines 33 and 37a'. The application of the supply voltage from the battery 37 to the electronic control circuit 36 in this manner readies the latter for operation. It should be noted in that connection that the electronic control circuit 36 remains de-energized when the switch arm 43'' is depressed since relay A is not energized in that case. With an operationally readied electronic control circuit 36, the relay C is energized as soon as the sensor 35 is capacitatively changed, i.e., as soon as the distributed capacity at wire 35 changes. Energization of the relay C causes closing of the switch c which, in turn, causes energization of the relay B as wel as energization of the relay D by way of the branch line 34'. Energization of the relay D closes its holding circuit 34a by closing switch d while energization of relay B causes reversal of the direction of rotation of the motor M due to reversal of polarity of the connection of the energizing circuit 32 with the power supply 37 as a result of actuation of reversing switches $b_{11}$ and $b_{12}$. As a result thereof, the motor M which heretofore was rotating in the closing direction of the window due to depressing switch arm 43' is now reversed in its direction of rotation os that notwithstanding depressing of switch arm 43' causes the window to be opened for such length of time as the rocker-type switch 43 remains depressed in the manner described. In other words, the opening movement of the window remains for such length of time until the switch 43 is again released, even though the sensor 35 no longer energizes the electronic control circuit 36 and the switch c is opened as a result of de-energization of relay C. This is so as the switch d remains closed due to continued energization of relay D which also constitutes a holding circuit for the relay B which in the energized condition actuates the reversing switches $b_{11}$–$b_{12}$ in such a manner that the corresponding windowpane will continue in its downward, opening movement.

For the other window motors near the co-driver seat or for the rear windows, the same modification of the described installation applies as for the circuit of the driving motor at the driver door.

The electronic control circuits 24 and 34 are, as indicated above, of conventional construction utilizing commercially available parts and therefore not described in detail herein. Suffice it to say that circuits, such as bridge circuits, etc., sensing a change in capacity in one branch or other electronic circuits responsive to signals representing or reflecting a change in capacity in the input thereof are known as such and are utilizable in the same manner in the control circuits of this invention.

While I have shown and described only two embodiments in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

What I claim is:

1. An installation for the protection against squeezing-in by movable structural parts actuatable by an electric motor means with switch means at the required places, characterized in that an electronic control circuit means together with an energizing circuit means for the driving motor means of the movable structural part are adapted to be supplied with current by way of the respective switch means thereof, in that the electronic control circuit means is controlled upon contact of a sensing means with simultaneous interaction on further means for at least stopping the driving motor means upon response of the control circuit means, and in that in addition to the switch means for the driving motor means a first relay means is connected in parallel to the driving motor means, a switch for the electronic control circuit means being controllable by said first relay means, that a second relay means with a second switch for the current supply of a third relay means is adapted to be energized by the electronic control circuit means and that at least one switch in the motor energizing circuit means is controllable by the third relay means.

2. An installation according to claim 1, characterized in that the structural part is a movable windowpane.

3. An installation according to claim 1, characterized in that the structural parts are pivotal structural parts.

4. An installation according to claim 1, characterized in that the structural parts are displaceable structural parts.

5. An installation according to claim 4, characterized in that the sensing means is arranged at the upper edge of the windowpane.

6. An installation according to claim 1, characterized in that the sensing means is arranged at the upper edge of the movable structural part.

7. An installation according to claim 1, characterized in that the sensing means is arranged at the upper edge of the fixed opening frame.

8. An installation according to claim 1, characterized in that the sensing means is constructed as switching wire having a capacity that changes upon contact with a body part.

9. An installation with a power supply for the protection against squeezing-in by movable structural parts actuatable by an electric motor means with switch means at the required places, characterized in that an electronic control circuit means together with an energizing circuit means for the driving motor means of the movable structural part are adapted to be supplied with current by way of the respective switch means thereof, in that the electronic control circuit means is controlled upon contact of a sensing means with simultaneous interaction on further means for at least stopping the driving motor means upon response of the control circuit means and in that the switch means in the motor energizing circuit means is connected to a reversing switch means, that the motor energizing circuit means is adapted to be supplied with current directly from the power supply by way of the reversing switch means and the first-mentioned switch means, first relay means adapted to be supplied with current from the power supply by said first-mentioned switch means, the electronic control circuit means being directly connected with the power supply, a second relay means controlled by the electronic control circuit means which includes a switch controlling a third relay means controlling the reversing switch means of the motor energizing circuit means and a fourth relay means adapted to be supplied with current by the switch of the second relay means, and in that a switch of the fourth relay means is connected in a branch line forming a holding circuit to the power supply from the fourth relay means.

10. An installation according to claim 9, characterized in that the sensing means is constructed as switching wire having a capacity that changes upon contact with a body part.

* * * * *